United States Patent [19]

Quate

[11] Patent Number: 4,797,693

[45] Date of Patent: Jan. 10, 1989

[54] POLYCHROMATIC ACOUSTIC INK PRINTING

[75] Inventor: Calvin F. Quate, Stanford, Calif.

[73] Assignee: Xerox Corporation, Stamford, Conn.

[21] Appl. No.: 57,874

[22] Filed: Jun. 2, 1987

[51] Int. Cl.⁴ .............................................. G01D 15/16

[52] U.S. Cl. ...................................... 346/140 R; 358/75

[58] Field of Search .................... 346/140, 75, 46, 157; 358/75; 355/4

[56] References Cited

U.S. PATENT DOCUMENTS

| | | | |
|---|---|---|---|
| 4,046,073 | 9/1977 | Mitchell | 346/1.1 X |
| 4,308,547 | 12/1981 | Lovelady et al. | 346/140 |
| 4,494,128 | 1/1985 | Vaught | 346/140 |
| 4,518,987 | 5/1985 | Saitoh | 358/75 |
| 4,538,160 | 8/1985 | Uchiyama | 346/140 |
| 4,608,577 | 8/1986 | Hori | 346/140 |
| 4,642,655 | 2/1987 | Sparer | 346/76 PH |
| 4,675,694 | 6/1987 | Bupara | 346/140 X |
| 4,697,195 | 9/1987 | Quate | 346/140 |
| 4,738,555 | 4/1988 | Nagashima | 346/76 PH X |
| 4,751,529 | 6/1988 | Elrod | 346/140 |

FOREIGN PATENT DOCUMENTS 0195863 10/1986 European Pat. Off. .

OTHER PUBLICATIONS

Krause, K. A., "Focusing Ink Jet Head", IBM Technical Disclosure Bulletin, vol. 16, No. 4, Sep. 1973.

Quate, Calvin F., "The Acoustic Microscope", Scientific American, vol. 241, No. 4, Oct. 1979, pp. 62–70.

Quate, Calvin F., "Acoustic Microscopy", American Institute of Physics Today, Aug. 1985, pp. 34–42.

*Primary Examiner*—Joseph W. Hartary

[57] ABSTRACT

Polychromatic acoustic ink printers are disclosed, including several embodiments which utilize a single printhead for ejecting droplets of ink on command from a transport which carries the different colored inks past the printhead in timed synchronism with the printing of the corresponding color separations. If desired, a diluent also may be provided to permit the printing of an intensity mask.

A variety of transports are described, including single ply solid or perforated films, as well as laminated multiple ply films composed of a solid or perforated lower layer, a perforated or mesh upper layer, and, in some embodiments, one or more perforated intermediate layers. Furthermore, it is disclosed that a perforated transport may be overcoated with a patterned metallization so that an electric field can be generated to assist in controlling the droplet ejection process. Some of the transports are designed to carry the inks in a liquid state. However, others are suitable for carrying the inks in a solid state, so provision may be made for liquefying the inks, such as by heating them, as they approach the printhead or printheads.

23 Claims, 5 Drawing Sheets

POLYCHROMATIC ACOUSTIC INK PRINTING

FIELD OF THE INVENTION

This invention relates to acoustic ink printing and, more particularly, to polychromatic acoustic ink printing.

BACKGROUND OF THE INVENTION

Acoustic ink printing is a promising direct marking technology because it does not require the nozzles or the small ejection orifices which have been a major cause of the reliability and pixel placement accuracy problems that conventional drop on demand and continuous stream ink jet printers have experienced.

It has been shown that acoustic ink printers having printheads comprising acoustically illuminated spherical focusing lenses can print precisely positioned picture elements ("pixels") at resolutions which are sufficient for high quality printing of relatively complex images. See, for example, the copending and commonly assigned U.S. patent applications of Elrod et al, which were filed Dec. 19, 1986 under Ser. No. 944,490, now U.S. Pat. No. 4,751,529, Ser. No. 944,698, now U.S. Pat. No. 4,751,530, and Ser. No. 944,701 on "Microlenses for Acoustic Printing", "Acoustic Lens Arrays for Ink Printing" and "Sparse Arrays for Acoustic Printing", respectively. It also has been found that such a printer can be controlled to print individual pixels of different sizes so as to impart, for example, a controlled shading to the printed image. See, another copending and commonly assigned U.S. patent application of Elrod et al, which was filed Dec. 19, 1986 under Ser. No. 944,286 on "Variable Spot Size Acoustic Printing".

Although acoustic lens-type droplet ejectors are favored for acoustic ink printing at the present time, there are other types of droplet ejectors which may be utilized, including (1) piezoelectric shell transducers, such as described in Lovelady et al U.S. Pat. No. 4,308,547, which issued Dec. 29, 1981 on a "Liquid Drop Emitter," and (2) interdigitated transducers (IDT's), such as described in a copending and commonly assigned Quate et al U.S. patent application, which was filed Jan. 5, 1987 under Ser. No. 946,682 on "Nozzleless Liquid Droplet Ejectors" now U.S. Pat. No. 4,697,195 as a continuation of application Ser. No. 776,291 filed Sept. 16, 1985 (now abandoned). Additionally, it should be understood that acoustic ink printing technology is compatible with various printhead configurations, including (1) single ejector embodiments for raster scan printing, (2) matrix configured arrays for matrix printing, and (3) several different types of pagewidth arrays, ranging from (i) single row, sparse arrays for hybrid forms of parallel/serial printing, to (ii) multiple row staggered arrays with individual ejectors for each of the pixel positions or addresses within a pagewidth address field (i. e., single ejector/pixel/line) for ordinary line printing.

To carry out acoustic ink printing with any of the aforementioned droplet ejectors, each of the ejectors launches a converging acoustic beam into a pool of ink, such that the beam converges to focus at or near the free surface (i.e., the liquid/air interface) of the pool. The radiation pressure this beam exerts against the free surface of the ink is modulated, such that it makes brief controlled excursions to a sufficiently high pressure level to overcome the restraining force of surface tension. As a result, individual droplets of ink are ejected from the free ink surface on command, with sufficient velocity to deposit the droplets on a nearby recording medium.

As will be appreciated, polychromatic or "color" acoustic printing introduces a new set of challenges. It is performed by printing a plurality of monochromatic color separations of an image (cyan, magenta and yellow are the "primary colors" for subtractive color) in substantial registration with each other. Furthermore, it often is desirable to have the capacity to print a black separation, so the composition of a polychromatic image typically involves the printing of up to four different color separations in superimposed registration. These color separations can be printed by separate printheads, but a significant cost savings may be realized if provision is made for printing them with a single printhead. Additionally, a diluent may be used in some cases to provide an additional means for shading the images.

SUMMARY OF THE INVENTION

In accordance with the present invention, a polychromatic acoustic ink printer is provided. The preferred embodiments of the invention utilize a single printhead for ejecting droplets of ink on command from a transport which carries the different colored inks past the printhead in timed synchronism with the printing of the corresponding color separations. The transport may take a variety of forms, including single ply solid or perforated films, as well as laminated multiple ply films composed of a solid or perforated lower layer, a perforated or mesh upper layer, and, in some embodiments, one or more perforated intermediate layers. Spatially distinct, narrow stripes of different colored ink films may be applied to solid or mesh-type transport films, and these inks may be transported in either a liquid state or in a solid state. If the inks are transported in a solid state, they are liquefied, such as by heating them, as they approach the printhead. Alternatively, if a perforated transport media is employed, the ink may be applied in a liquid state to be entrained in the perforations. Moreover, a perforated transport media may be overcoated with a patterned metallization so that an electric field can be generated to assist in controlling the droplet ejection process. If desired, a diluent also may be provided to permit the printing of an intensity mask.

BRIEF DESCRIPTION OF THE DRAWINGS

Still other features and advantages of this invention will become apparent when the following detailed description is read in conjunction with the attached drawings, in which.

DETAILED DESCRIPTION OF THE ILLUSTRATED EMBODIMENTS

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Figure 1:
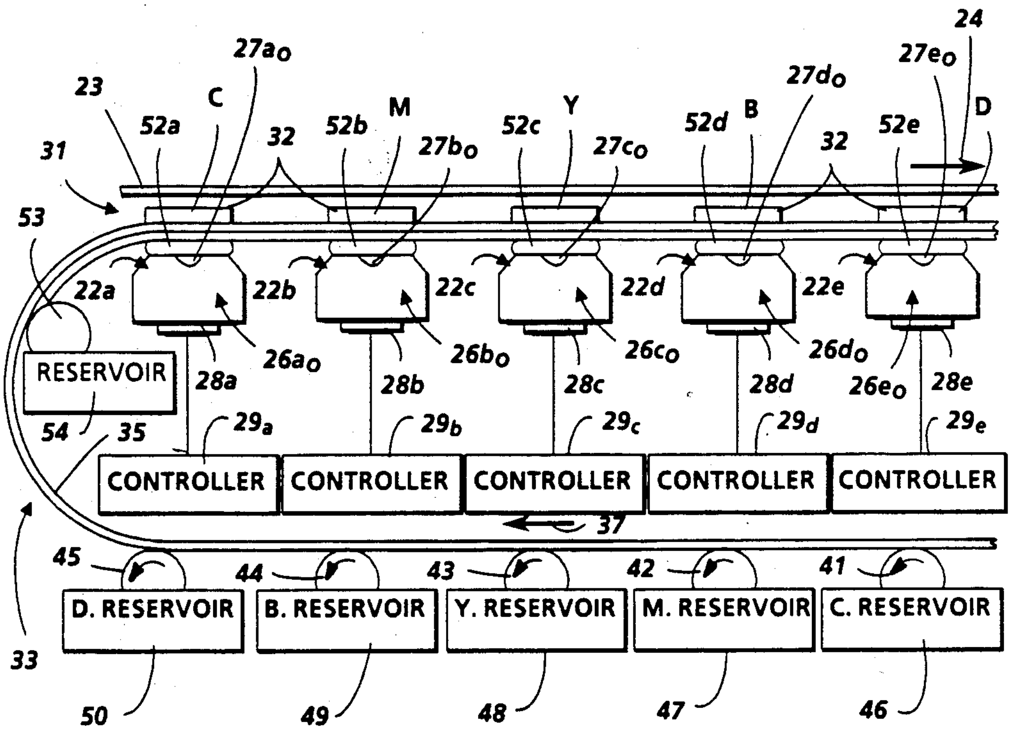
FIG. 1 schematically illustrates a multi-head color acoustic ink printer.

Turning now to the drawings, and at this point especially to FIG. 1, there is a polychromatic acoustic ink printer 21 having a plurality of essentially identical printheads 22a–22e for sequentially printing different monochromatic color separations of a polychromatic image, together with an optional intensity mask, in superimposed registration on a suitable recording medium 23. To that end, the recording medium 23 is longitudinally advanced during operation in a cross-line direction with respect to the printheads 22a–22e, as indicated by the arrow 24. The printheads 22a–22e, in turn, are spaced apart longitudinally of the recording medium 23 and are aligned with each other laterally thereof, so they sequentially address essentially the same pixel positions or addresses on the recording medium 23.

Typically, yellow, cyan and magenta color separations are printed because they subtractively combine to define the various hues of a polychromatic image. The superimposition of these monochromatic separations occurs sequentially, preferably with a sufficient intervening time delay to ensure that each color substantially dries before the next one is superimposed upon it, thereby inhibiting unwanted mixing of the inks. Although three printheads 22a–22c are adequate for polychromatic printing, a fourth 22d advantageously is provided for printing a black separation, and a fifth 22e may be employed for controllably overwriting the image with an appropriate diluent to vary the intensities of its hues. In effect, the use of the optional diluent permits the printing of the aforementioned intensity mask.

As previously pointed out, the printheads 22a–22e may be configured in many different ways and may embody any one of several different types of acoustic droplet ejectors. With that it mind, it has been assumed for illustrative purposes that the printheads 22a–22e comprise full (i.e., single ejector/pixel/line) pagewidth arrays of droplet ejectors $26a_0$–$26a_n$, $26b_0$–$26b_n$, $26c_0$–$26c_n$, $26d_0$–$26d_n$, and $26e_0$–$26e_n$, respectively (only the near end ejectors $26a_0$–$26e_0$ can be seen). Nevertheless, it will be appreciated that other printhead configurations could be employed, including some that would require an appropriately synchronized relative scan motion (not shown) between the printheads 22a–22e and the recording medium 23 along an axis orthogonal to the arrow 24. Furthermore, while single row ejector arrays are shown for convenience, it will be understood that it may be desirable in practice to employ multiple row staggered arrays for the purpose of increasing the center-to-center spacing of the ejectors. Moreover, even though the ejectors $26a_0$–$26a_n$, . . . $26e_0$–$26e_n$ are depicted as comprising spherical acoustic focusing lenses $27a_0$–$27a_n$, . . $27e_0$–$27e_n$ (again, only the near end lenses $27a_0$–$27e_0$ can be seen) which are illuminated by acoustic waves emanating from piezoelectric transducers 28a–28e under the control of suitable controllers 29a–29e, respectively, it will be evident that other types of droplet ejectors may be employed. The printhead configuration employed may influence or even dictate the choice of droplet ejectors, but those details are beyond the scope of the present invention.

Furthermore, from a system standpoint, it will be apparent from the aformentioned Elrod et al application, Ser. No. 944,286, which is hereby incorporated by reference, that the controllers 29a–29e may perform the dual function of (1) controlling the droplet ejection timing of the individual ejectors $26a_0$–$26a_n$, $26b_0$–$26b_n$, $26c_0$–$26c_n$, $26d_0$–$26d_n$, and $26e_0$–$26e_n$ within the printheads 22a–22e, respectively, and of (2) modulating the size of the individual pixels printed by those ejectors. Indeed, pixel size control, whether affected by modulating the size of the droplets that are ejected and/or by varying the number of droplets that are deposited per pixel, is highly desirable for polychromatic printing because it provides increased control over the color composition of the image.

A wide range of techniques may be employed for supplying the different colored inks and the optional diluent (collectively referred to herein as a "marking solution" 31) which the printer 21 utilizes to print polychromatic images. The cyan ("C"), magenta ("M"), yellow ("Y"), black ("B") and diluent ("D") components of the marking solution 31 are separated from each other, so that each of the printheads 22a–22e prints a different one of them on the recording medium 13. More particularly, as shown in FIG. 1, the ejectors $26a_0$–$26a_n$, $26b_0$–$26b_n$, $26c_0$–$26c_n$, $26d_0$–$26d_n$, and $26e_0$–$26e_n$ of the printheads 22a–22e are acoustically coupled to the cyan ink C, the magenta ink M, the yellow ink Y, the black ink B, and the diluent D, respectively. As in other acoustic ink printers, each of the ejectors $26a_0$–$26a_n$, $26b_0$–$26b_n$, $26c_0$–$26c_n$, $26d_0$–$26d_n$, and $26e_0$–$26e_n$ launches a converging acoustic beam into the marking solution 31 during operation, and each of those beams converges to focus approximately at the free surface 32 (i.e., the liquid/air interface) of the marking solution 31. In this particular embodiment, however, the printheads 22a–22e are dedicated to the cyan ("C"), magenta ("M"), yellow ("Y"), black ("B") and diluent ("D") components, respectively, of the marking solution 31. For that reason, the controllers 29a–29e for the printheads 22a–22e are driven by data (supplied by means not shown) representing the cyan, magenta, yellow and black color separations and the intensity masks, respectively, for the polychromatic images which are to be printed. That, in turn, causes the controllers 29a–29e to modulate the radiation pressures which the acoustic beams from the ejectors of the printheads 22a–22e, respectively, exert against the free surface 32 of the marking solution 31, whereby droplets of the different colored inks and of the diluent are ejected from the free surface 32 to print the color separations and the intensity mask for each of the images in superimposed registration on the recording medium 13.

Advantageously, means are provided for stabilizing the level of the free surface 32 of the marking solution 31, because any significant variation in its level tends to significantly affect the radiation pressures which the acoustic beams exert against it. While a liquid level control system could be employed for that purpose, a useful alternative is to provide a suitable transport mechanism 33 for routinely replacing the depleted marking solution 31 with a fresh supply, such that the level of its free surface 32 is regularly restored.

Figure 3:
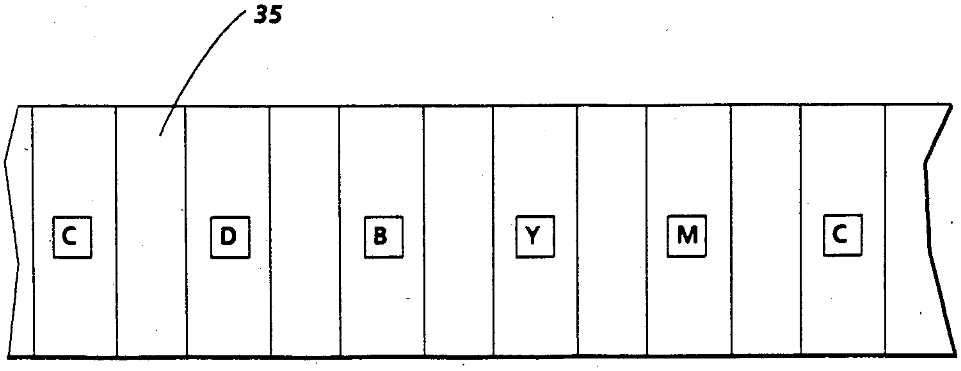
FIG. 3 is a fragmentary plan view of a single ply ink transport for the printers shown in FIGS. 1 and 2.

For example, as shown in FIGS. 1 and 3, the transport mechanism 33 comprises a web-like carrier 35, which suitably is composed of a solid, thin (e.g., 0.001 inch thick) flexible polymer film, such as mylar, polypropolene, or a similar polyimide. Alternatively, the carrier 35 may be fabricated from a flexible metallic film, such as a nickel film to name one example. The carrier 35 laterally extends across the full pagewidth of the printer 21, and provision (not shown) is made for longitudinally stepping it during operation in the direction of the arrow 37. For stabilizing the level of the free surface 32 of the marking solution 31, substantially uniformly thick, pagewidth wide, thin (e.g., 0.001 inch thick) films of cyan ink C, magenta ink M, yellow ink Y, black ink B and diluent D are applied to the upper surface of the carrier 35 in repetitive longitudinally ordered serial sequence. The center-to-center longitudinal displacement of the narrow stripes of the different colored inks and the diluent within each repetition of this coating pattern is selected to substantially match the longitudinal spacing of the printheads 22a–22e. In operation, therefore, the carrier 35 is incrementally advanced at the line printing rate to move one after another of the repeats of the C, M, Y, B, and D coating pattern into alignment with the printheads 22a–22e for the printing of successive lines of the color separations and the intensity mask. As will be appreciated, the cyan, magenta, yellow, and black color separations and the intensity mask for each line of a polychromatic image are sequentially printed in superimposed registration on the recording medium 13 as it moves across the printheads 22a–22e, respectively, so the printing of a single line of such an image may involve up to five repetitions of the C, M, Y, B and D coating pattern. If desired, the carrier 35 may be coated with a material (not shown) selected to control the manner in which the inks and diluent wet it. Suitable anti-wetting agents and wetting agents are readily available and may be employed as desired to enhance the performance of the carrier 35 and/or of any of the other ink transpots described hereinafter.

Various techniques may be employed for repetitively applying the cyan (C), magenta (M), yellow (Y), and black (B) inks and the diluent (D) to the carrier 35. For instance, as shown in FIG. 1, these coatings may be applied by eccentric applicator rolls 41–45 which are rotated in appropriately phased relationship (by means not shown) at a predetermined rate for transferring the different colored inks and the diluent from separate reservoirs 46–50, respectively, to the upper surface of the carrier 35. The eccentricity of the applicator rolls 41–45 and their phasing cause them to coat longitudinally distinct sections of the carrier 35 in repetitive serial ordered sequence, and the rate at which the rolls 41–45 are rotated is selected so that the center-to-center displacement of the C, M, Y, B and D coatings within each repetition of the coating pattern substantially matches the longitudinal separation of the printheads 22a–22e. In practice, of course, doctor blades or the like (not shown) may be employed to ensure that the C, M, Y, B, and D coatings deposited on the carrier 35 are of generally uniform thickness. Moreover, it will be understood that the carrier 35 may be collected for disposal (by means not shown) after it passes beyond the printheads 22a–22e, or it may be cleaned and recirculated (also not shown) for subsequent re-use.

Ink transports are of even greater significance to the more detailed features of this invention because they facilitate the design of single printhead polychromatic acoustic ink printers. Acoustic beams propagate through thin polymer films, such as the carrier 35, without suffering excessive attenuation, but the interface between the printhead or printheads and the carrier 35 preferably is designed to ensure that efficient acoustic coupling is achieved. For that reason, as illustrated in FIG. 1, the printheads 22a–22e may be overcoated as at 52a–52e, respectively, with a plastic having a relatively low acoustic velocity. A copending and commonly assigned U.S. patent application of Scott Elrod, which was filed Dec. 19, 1986 under Ser. No. 944,145 on "Planarized Printheads for Acoustic Printing" describes the composition and function of the overcoatings 52a–52e in some detail. Thus, that application is hereby incorporated by reference, but in the interest of completeness it is noted that the lower surface of the carrier 35 bears against the relatively smooth outer surfaces of the printhead overcoatings 52a–52e. Moreover, a thin film of water or the like advantageously is applied to the lower surface of the carrier 35, such as by an applicator roll 53 which rotates in a water trough 54, so that acoustic energy is efficiently transferred from the printheads 22a–22e to the marking solution 31 via the carrier 35, even if there are minor mechanical irregularities at the printhead/carrier interface.

Figure 2:
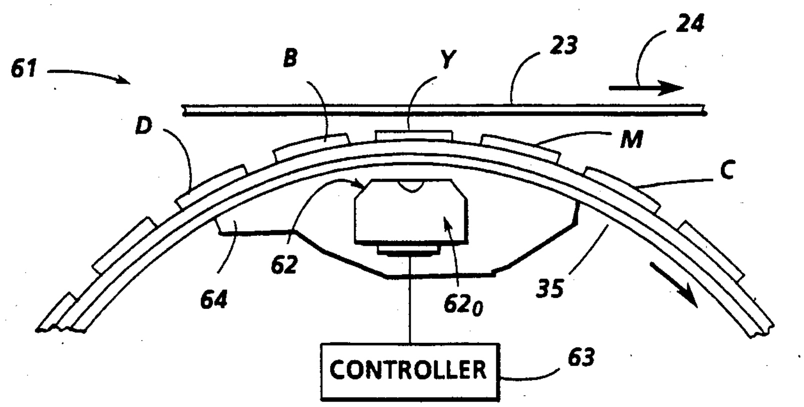
FIG. 2 schematically illustrates a single head color acoustic ink printer.

FIG. 2 illustrates a single printhead polychromatic printer 61 which closely corresponds to the multi-printhead printer 21 of FIG. 1. Like reference characters have been used to identify like parts in the interest of highlighting the structural and functional similarities that exist. As will be seen, the primary structural distinction is that the printer 61 has just one printhead 62, comprising one or more droplet ejectors $62_0$–$62_n$, (once again, only the near end ejector $62_0$ can be seen) for printing polychromatic images on the recording medium 13 under the control of a controller 63. Narrow laterally extending stripes of the different colored inks and of the diluent (see FIG. 3) are coated on the upper surface of the carrier 35 in repetitive serially ordered longitudinal sequence as previously described. In this embodiment, however, the carrier 35 is longitudinally stepped to sequentially move one after another of these stripes of ink and diluent into alignment with the printhead 62. The recording medium 13, on the other hand, remains in a fixed position with respect to the printhead 62 while the cyan, magenta, yellow and black color separations and the intensity mask for each line of the image are being sequentially printed on it, and it then is incrementally advanced longitudinally a predetermined line pitch distance with respect to the printhead 62, thereby positioning it for the printing of the next line of the image. As will be seen, another feature of the printer 61 is that the low acoustic velocity overcoating 64 for its printhead 62 has an arcuate crowned profile, so that the carrier 35 wraps over it to enhance its acoustic coupling to the printhead 62.

Figure 4:
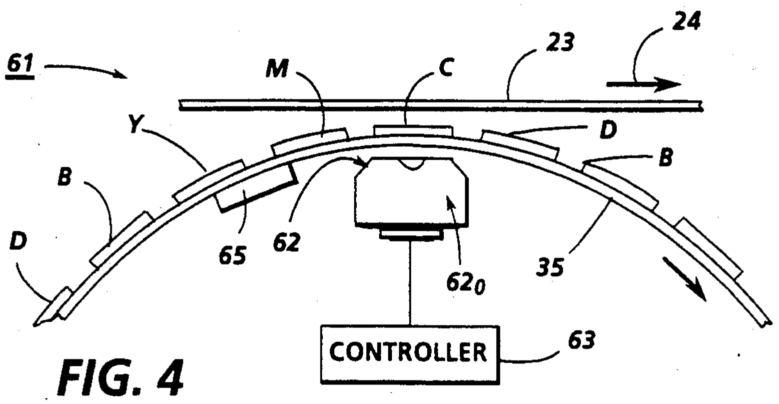
FIG. 4 is a schematic end view of an acoustic printhead having an embedded heating element for pre-melting solid inks carried by a single ply transport, such as shown in FIG. 3.

Ink transports have the additional advantage of facilitating the use of hot melt inks for polychromatic acoustic ink printing. Turning to FIG. 4 for an example in point, it will be seen that a heating element 65 may be installed along the path of the carrier 35, just ahead of the printhead 62, to enable a printer of the type depicted in FIG. 2 to utilize hot melt inks. More particularly, for polychromatic printing, substantially uniformly thick, thin films of cyan C, magenta M, yellow Y and black B hot melt ink are deposited (by means not shown) in repetitive serially ordered longitudinal sequence on the upper surface of the carrier film 35. These inks are transported in a solid state until they near the printhead 62, where they are liquefied by heat supplied by the heating element 65. The inks then remain in a liquid state while the carrier 35 moves one after another of them into alignment with the printhead 62 for the sequential printing of the superimposed color separations of a polychromatic image as previously described. However, the gradual cooling that occurs causes the inks to resolidfy after they have been moved beyond the printhead 62, with the result that the used portion of the carrier 35 then may be handled with less risk of being soiled by it. As illustrated, the plastic overcoating 63 for the printhead 62 supports the heating element 65, whereby the inks are heated from beneath by thermal energy transferred to them through the carrier 35. Alternatively, of course, the hot melt inks could be liquefied by heat supplied by a heater located either above the carrier 35 or at an oblique angle with respect to it (not shown).

Figure 5A:
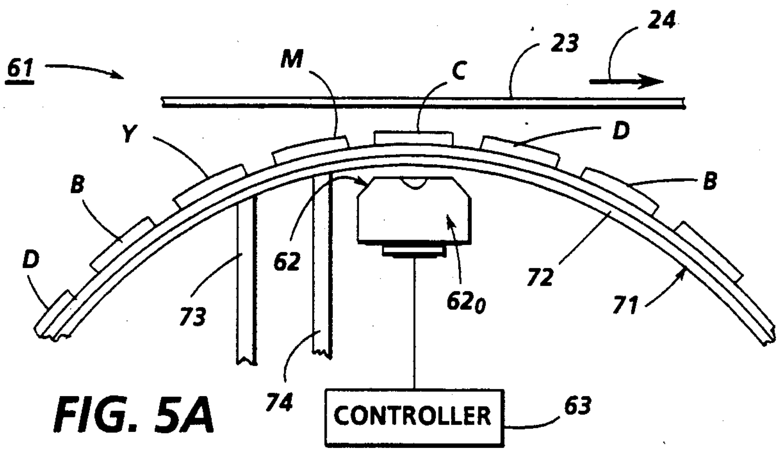
FIGS. 5A and 5B are schematic end views of acoustic ink printheads having embedded electrical wiper contacts for passing electrical currents through resistively heated ink transports on demand.
Figure 5B:
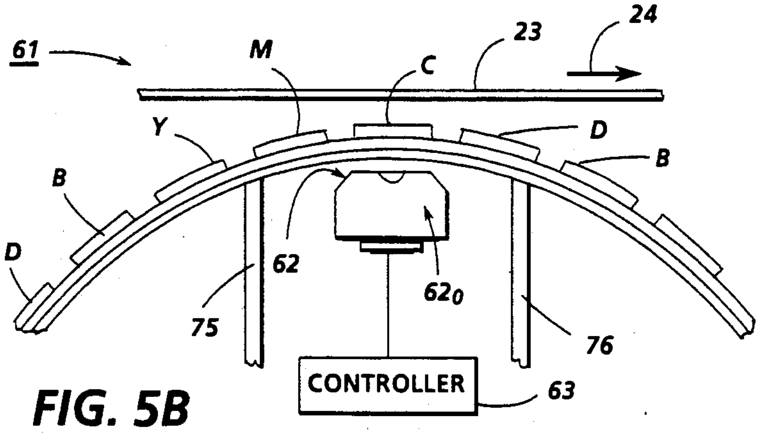

Localized electrical resistive heating of the ink transport may also be employed for liquefying hot melt inks. To that end, as shown in FIGS. 5A and 5B, repetitive serially ordered patterns of cyan C, magenta M, yellow Y and black B hot melt ink are deposited on the upper surface of a carrier film 71, substantially as previously described. In these embodiments, however, the lower surface of the carrier 71 is coated with a resistive metallization 72. Furthermore, there are a pair of longitudinally separated electrical wiper contacts 73 and 74 which are located just slightly ahead of the printhead 62 (FIG. 5A), or a similar pair of contacts 75 and 76 which are located on opposite sides of the printhead 62 (FIG. 5B), to pass a current through the segment of the metallization 72 which is between them at any given time, whereby the metallization 72 is resistively heated to liquefy the hot melt inks just before they reach the printhead 62.

Figure 6:
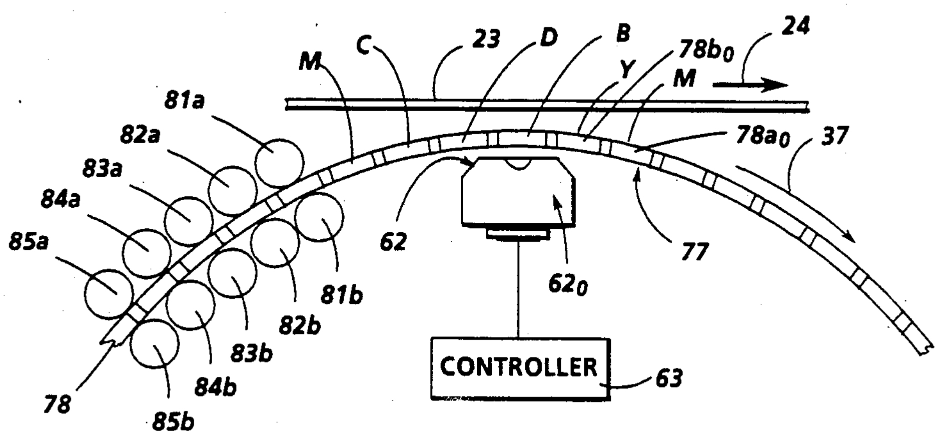
FIG. 6 is a simplified end view of a color acoustic ink printhead in combination with an external system of rollers for inking solid, mesh or perforated ink transports.
Figure 7:
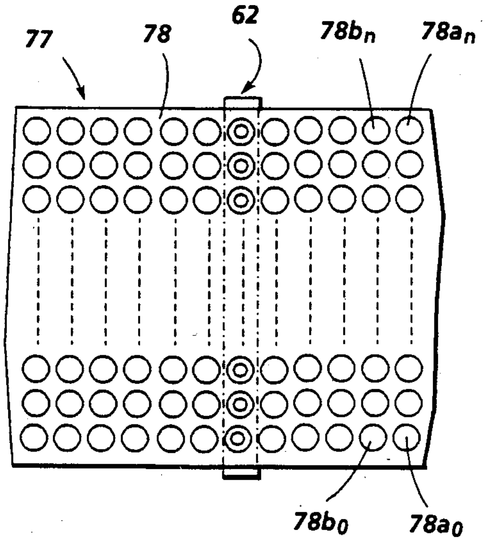
FIG. 7 is a fragmentary plan view of a perforated single ply ink transport for the printers shown in FIGS. 1 and 2.

Still another option is to employ perforated ink transports for delivering the different colored inks and the optional diluent that are employed by single or multiple printhead polychromatic acoustic ink printers. As shown in FIGS. 6 and 7, a basic perforated ink transport 77 comprises a web 78 having a longitudinally repeated pagewidth pattern of apertures 78$a_0$–78$a_n$, 78$b_0$–78$b_n$, ... passing through it. Typically, the web 78 is composed of a flexible polymer film, which is surface coated with an ink repellant (e.g. a hydrophobic coating for water based inks or an oleophobic coating for oil based inks). During operation, the web 78 is longitudinally incremented in the direction of the arrow 37, essentially as described with reference to the transports of FIGS. 2 and 4. In this instance, however, the different colored inks and the optional diluent are entrained in the apertures 78$a_0$–78$a_n$, 78$b_0$–78$b_n$, . . . of the web 78 for sequential delivery to the printhead 62.

To deliver the ink and the optional diluent, the apertures 78$a_0$–78$a_n$, 78$b_0$–78$b_n$, . . . are arranged widthwise of the web 78 in pagewidth rows on centers selected to laterally align each of them with a predetermined pixel position (or, in other words, with a predetermined one of the droplet ejectors 62$a$–62$n$ when, as here, a full pagewidth array of droplet ejectors is employed). Adjacent rows of apertures 78$a_0$–78$a_n$, 78$b_0$–78$b_n$, . . . are displaced a fixed distance from each other lengthwise of the web 78. Moreover, the apertures within adjacent rows are either laterally aligned or laterally staggered with respect to each other, depending on whether one or more than one, respectively, row of apertures is needed to form a complete "pagewidth pattern of apertures." As used herein, a "pagewidth pattern of apertures" means a set of apertures, distributed over one or a plurality of adjacent rows, having a one-for-one lateral correspondence with the pixel positions or addresses of a full pagewidth address field. Preferably, the aperture diameters are large relative to the waist diameter of the focused acoustic beams from the droplet ejectors 62$a_0$–62$a_n$, thereby ensuring that the sizes of the ejected droplets are essentially independent of the apertures diameters. Therefore, in practice, each "pagewidth pattern of apertures," as that term is used herein, is likely to comprise a plurality of adjacent rows of laterally staggered apertures.

Figure 8:
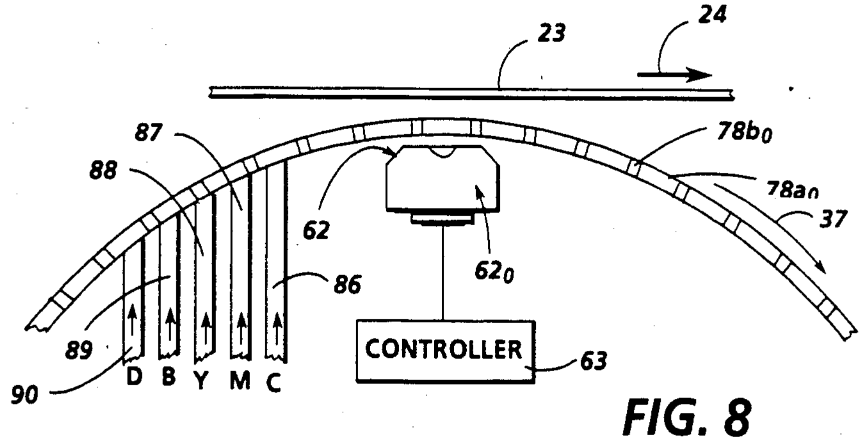
FIG. 8 is a simplified, fragmentary sectional view of a color acoustic ink printhead having pressurized fountains for inking perforated ink transports, such as shown in FIG. 7.

The colored inks and the optional diluent are loaded into the apertures 78$a_0$–78$a_n$, 78$b_0$–78$b_n$, . . . of successive pagewidth aperture patterns in repetitive serially ordered longitudinal sequence. As shown in FIG. 6, appropriately phased, opposed eccentric applicator rolls 81$a$–81$b$, 82$a$–82$b$, 83$a$–83$b$, 84$a$–84$b$ and 85$a$–85$b$ may be employed for loading the inks and the diluent into the apertures 78$a_0$–78$a_n$, 78$b_0$–78$b_n$, . . . from the top and the bottom. Alternatively, individual applicator rolls may be utilized to load the apertures from the bottom only. FIG. 8 illustrates still configuration in which the web 78 rides over fountains 86–90 while enroute to the printhead 62, and the fountains 86–90 are operated in appropriately phased relationship (by means not shown) to fill the apertures 78$a_0$–78$a_n$, 78$b_0$–78$b_n$, . . . from the bottom.

Figure 9:
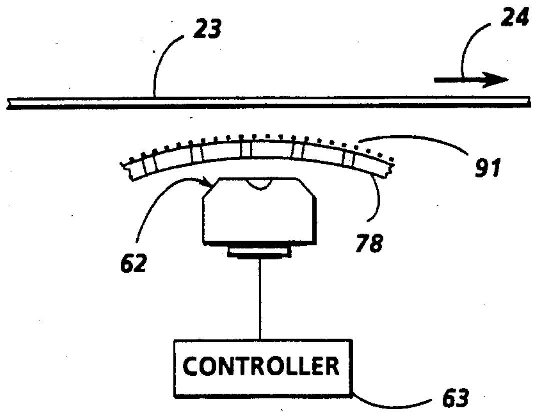
FIG. 9 is fragmentary elevational view of a dual layer ink transport for the printers shown in FIGS. 1 and 2.
Figure 10:
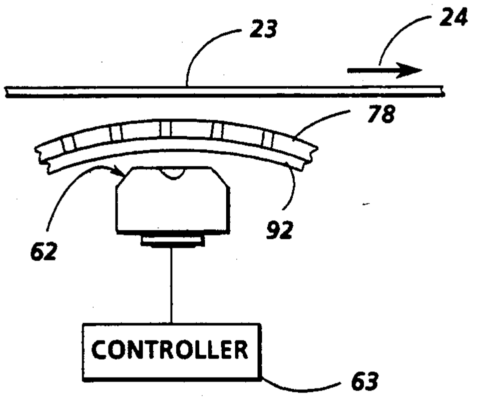
FIG. 10 is a fragmentary elevational view of an alternative dual layer ink transport.

Referring to FIG. 9, the web 78 of a bottom loaded perforated ink transport may be overcoated with a mesh screen 91 to inhibit particulate contaminants from falling into the ink entrained in its apertures 78$a_0$–78$a_n$, 78$b_0$–78$b_n$, . . . Similarly, as shown in FIG. 10, may be laminated on a solid substrate film 92 which, in turn, may be employed in conjunction with a suitable heater (not shown) to accommodate hot melt inks, as discussed hereinabove.

Figure 11:
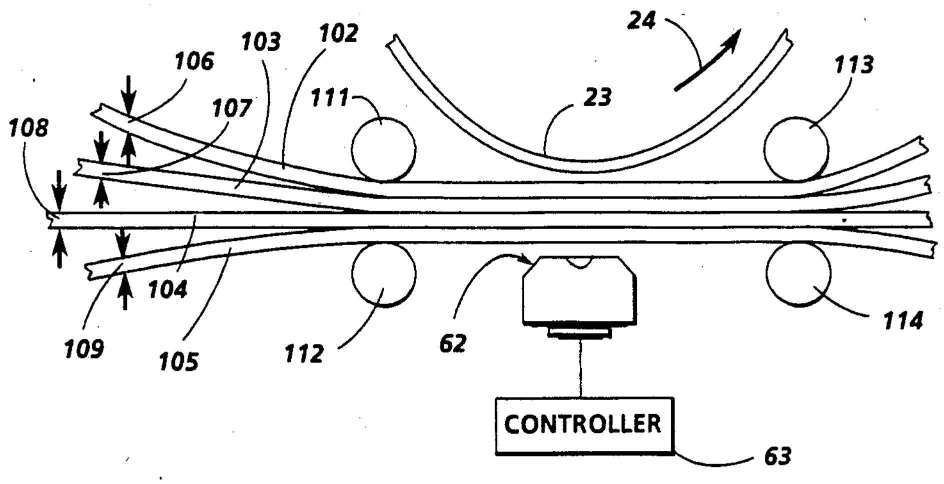
FIG. 11 is a simplified end view of a single head color acoustic ink printer having an externally inked multiple ply ink transport comprising separate layers for transporting inks of different colors and a diluent.

Various extensions and modifications of the above-described ink transports will suggest themselves. For example, as shown in FIG. 11, there is multiple ply transport 101 comprising separate perforated films 102–105 for carrying the different colored inks that are employed for printing the color separations of polychromatic images (another ply could be provided to carry the diluent if desired). These films 102–105 may be spread apart while ink and/or diluent are being loaded, as at 106–109, respectively, into their apertures, and they then are brought together, such as by passing them between two pairs of pinch rolls 111, 112 and 113, 114 which are located on opposite sides of the printhead 62, to form a multiple ply laminate for sequentially delivering the inks and the diluent (if used) to the printhead 62. The loading of the films 102–105 causes the inks and optional diluent to be delivered to the printhead 62 in ordered serial sequence, substantially as previously described, and matching pagewidth aperture patterns may be formed in all of the films 102–105. Or, as shown, the films 102–105 may have longitudinally staggered repetitive pagewidth aperture patterns plus apertures matching the aperture pattern of each underlying film. When these multi-ply transports are employed in single printhead printers, the volume of the marking solution that is loaded into the apertures of the different plys is adjusted so that the free surface of the marking solution is essentially level for all of the components of the marking solution at the time that they are delivered to the printhead 62, even though each of the marking solution components is initially loaded onto a different one of the plys or films 102–105.

Figure 12:
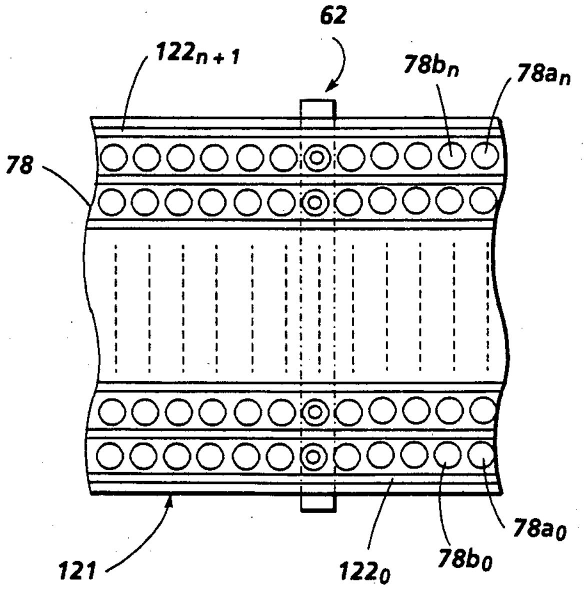
FIG. 12 is a fragmentary plan view of a perforated ink transport having a conductive overcoating which is patterned to define individually addressable electrodes for selectively subjecting individual cells of the transport to the stimulation of an electric field so as to provide increased discrimination between the cells from which droplets of ink are and are not to be ejected.

Another perforated ink transport 121 is shown in FIG. 12. This is a single ply embodiment having longitudinally extending, individually addressable electrodes $\mathbf{122_0}$–$\mathbf{122_{n+1}}$, which are deposited on the web 78, such as by photolithography, laterally adjacent the apertures $\mathbf{78a_0}$–$\mathbf{78a_n}$, $\mathbf{78b_0}$ $\mathbf{78b_n}$, . . . Thus, each of the apertures $\mathbf{78a_0}$–$\mathbf{78a_n}$, $\mathbf{78b_0}$–$\mathbf{78b_n}$, . . . is laterally straddled by two neighboring electrodes, whereby the ink or diluent entrained in a given aperture may be excited to an incipient, subthreshold energy level for droplet ejection by creating an electric field between its two neighboring electrodes and a counter-electrode (not shown). This enhances the on/off switching characteristics of the acoustic printhead or printheads. See, a copending and commonly assigned U.S. patent application of Elrod, which was filed Oct. 22, 1986 under Ser. No. 921,893 on "Capillary Wave Controllers for Nozzleless Droplet Ejectors" as a continuation of application Ser. No. 820,045 filed Jan. 1, 1986 (now abandoned).

CONCLUSION

In view of the foregoing, it will now be understood that the present invention provides polychromatic acoustic ink printers, including single printhead printers. Furthermore, it will be appreciated that the ink transports which have been disclosed can be utilized for single or multiple printhead printers. Various printer, printhead and ink transport configurations have been described, but they will naturally lead to still others.

What is claimed:

1. An acoustic ink printer for printing polychromatic images on a recording medium, said printer comprising the combination of
   - a marking solution containing a plurality of different colored liquid inks, said marking solution having a free surface proximate said recording medium, with said different colored inks appearing on said free surface in a predetermined order;
   - a single acoustic printhead acoustically coupled to said marking solution for launching converging acoustic waves into said marking solution such that the free surface of said marking solution is radiated with focused acoustic energy, whereby radiation pressure is exerted against said surface;
   - transport means for sequentially bringing the different colored inks of said marking solution into alignment with said printhead; and
   - controller means coupled to said printhead means for modulating the radiation pressure exerted against the different colored inks appearing on said free surface in accordance with data representing corresponding color separations of a polychromatic image, whereby droplets of said different colored inks are ejectedon command from said free surface to print said color separations in superimposed registration on said recording medium.

2. The acoustic ink printer of claim 1 wherein
   - said transport means repetitively brings said different colored inks into alignment with said printhead in accordance with said predetermined serial order for line-by-line sequential printing of said color separations, and
   - said recording medium is advanced a predetermined line pitch distance with respect to said printhead after a line is printed, thereby positioning it for the printing of another line.

3. The acoustic ink printer of claim 2 wherein
   - said transport means is an ink transport which is longitudinally advanced across said printhead, and said inks are carried by said transport in repetitive longitudinally ordered serial sequence, whereby successive repeats of said sequence supply the inks for printing the color separations for successive lines of said image.

4. The acoustic ink printer of claim 3 wherein said marking solution further includes a diluent which is carried by said transport in repetitive longitudinally ordered serial sequence with said inks, with said diluent being in a trailing position with respect to said inks, thereby enabling said printhead to overwrite an intensity mask on the color separations for each line of said image.

5. The acoustic ink printer of claim 3 wherein
   - said transport has a plurality of longitudinally separated pagewidth patterns of apertures formed in it, and
   - said printer further includes means located ahead of said printhead for loading said different colored inks into the apertures of successive ones of said patterns for alignment with said printhead in accordance with said repetitive sequence.

6. The acoustic ink printer of claim 3 wherein
   - said transport comprises a solid lower layer and an apertured upper layer,
   - said inks are hot melt inks which are carried toward said printhead in a solid state on the lower layer of said transport, and
   - said printer further includes a heating element proximate said transport at a location ahead of said printhead for liquefying said inks, whereby said inks are in a liquid state while they are being transported across said printhead.

7. The acoustic ink printer of claim 2 wherein
   - said transport is a thin film web which is guided between said printhead and said recording medium,
   - said inks are coated on a surface of said web in said repetitive longitudinally ordered sequence, said surface facing said recording medium, and said printhead is acoustically coupled to said inks via said web.

8. The acoustic ink printer of claim 7 further including means for applying substantially uniformly thick, thin films of said inks to said surface of said web in a liquid state and in accordance with said repetitive longitudinally ordered sequence.

9. The acoustic ink printer of claim 8 wherein said marking solution further includes a diluent, and said means for applying said inks includes means for applying substantially equally thick, thin films of said diluent to said surface of said web within each repeat of said sequence.

10. The acoustic ink printer of claim 7 wherein said inks are hot melt inks, and said printer further includes heating means proximate said web for liquefying said hot melt inks as they approach said printhead.

11. The acoustic ink printer of claim 10 wherein said heating means is a heating element supported ahead of said printhead for liquefying said inks as they approach said printhead, and said inks gradually cool and resolidify after being transported across said printhead.

12. The acoustic ink printer of claim 10 wherein said heating element is supported beneath said web to transfer heat for liquefying said inks through said web.

13. The acoustic ink printer of claim 10 wherein said web has an electrically resistive surface facing away from said recording medium, and said heating means includes a pair of spaced apart electrical wiper contacts engaged with the resistive surface of said web for passing an electrical current therethrough, whereby said inks are liquefied by electrical resistive heating.

14. The acoustic ink printer of claim 13 wherein said contacts are both located ahead of said printhead, and said inks gradually cool and resolidfy after being transported across said printhead.

15. The acoustic ink printer of claim 14 wherein said web is a polymer film having an electrically resistive metalized backing engaged with said wiper contacts, whereby said inks are liquefied by electrical resistive heating of said backing.

16. The acoustic ink printer of claim 14 wherein said web is a polymer film having an electrically resistive metalized backing engaged with said wiper contacts, whereby said inks are liquefied by electrical resistive heating of said backing.

17. The acoustic ink printer of claim 16 wherein said marking solution further includes a diluent which is loaded into the apertures of predetermined ones of said pagewidth patterns, whereby said diluent is moved into alignment with said printhead to conclude each repeat of said sequence, thereby enabling said printhead to overwrite an intensity mask on the color separations for each line of said image.

18. The acoustic ink printer of claim 16 wherein said means for loading said apertures includes separate fountains for said different colored inks, said fountains being disposed below said transport for loading said inks into said apertures from beneath.

19. The acoustic ink printer of claim 13 wherein one of said contacts is located ahead of said printhead and the other of said contacts is located beyond said printhead, and said inks gradually cool and resolidfy after being transported beyond said other of said contacts.

20. The acoustic ink printer of claim 19 further including separate reservoirs for said different colored inks, and wherein said means for loading said apertures includes applicator rolls disposed between said reservoirs and said transport for transferring said inks from said reservoirs to the apertures of said transport.

21. The acoustic ink printer of claim 20 wherein said marking solution further includes a diluent which is loaded into the apertures of predetermined ones of said pagewidth patterns, whereby said diluent is moved into alignment with said printhead to conclude each repeat of said sequence, thereby enabling said printhead to overwrite an intensity mask on the color separations for each line of said image.

22. The acoustic ink printer of claim 19 wherein said transport comprises a plurality of plys, said printer further includes means remote from said printhead for loading the different colored inks onto different ones of said plys while said plys are spread apart, and means proximate said printhead for bringing said plys together into a laminate to transport said inks across said printhead; each overlying ply of said laminate having successive pagewidth patterns of apertures formed therein for carrying the ink loaded onto said ply, together with additional pagewidth patterns of apertures in alignment with the ink carried by each underlying ply, and the volumes of ink loaded onto said plys are selected so that different colored inks have a generally constant surface level.

23. The acoustic ink printer of claim 19 further including longitudinally extending, individually addressable electrodes deposited on said web along side said apertures, such that each apertures is disposed between a pair of said electrodes, whereby electric fields may be selectively established between adjacent ones of said electrodes to assist in the ejection of droplets from the apertures disposed therebetween.

* * * * *